United States Patent [19]

Waltrip

[11] 4,130,483
[45] Dec. 19, 1978

[54] SEWAGE TREATING AND CONVERSION PROCESS

[75] Inventor: Owen R. Waltrip, Roseville, Calif.

[73] Assignee: Nuclear Supreme, Casper, Wyo.

[21] Appl. No.: 842,370

[22] Filed: Oct. 14, 1977

[51] Int. Cl.² .......................................... B01D 15/00
[52] U.S. Cl. ................................ 210/40; 210/42 R; 204/152; 204/186
[58] Field of Search .................. 210/39, 40, 71, 30 R, 210/32, 63 R, 243, 42 R; 204/149, 152, 186, 302

[56] References Cited

U.S. PATENT DOCUMENTS

| | | | |
|---|---|---|---|
| 3,130,146 | 4/1964 | Plaster | 210/63 R |
| 3,730,885 | 5/1973 | Makrides et al. | 210/40 |
| 3,763,040 | 10/1973 | Timpe et al. | 210/40 |
| 3,915,822 | 10/1975 | Veltman | 204/149 |
| 3,965,037 | 6/1976 | Kennedy | 210/40 |
| 4,013,554 | 3/1977 | Reis et al. | 210/40 |
| 4,036,750 | 7/1977 | Jaros et al. | 210/40 |

Primary Examiner—Charles N. Hart
Assistant Examiner—Benoît Castel
Attorney, Agent, or Firm—Clarence A. O'Brien; Harvey B. Jacobson

[57] ABSTRACT

Aqueous sewage is conducted in series through two filter beds with which the sewage reacts within settling tanks. The tanks are charged with particulate coke formed from the coking of a high sulphur coal with steam. The gaseous products of the coking operation are fed to one of the settling tanks within which an electric field is established to electrically charge the filter bed.

3 Claims, 3 Drawing Figures

SEWAGE TREATING AND CONVERSION PROCESS

BACKGROUND OF THE INVENTION

1. Field of the Invention

This invention relates generally to the ecologically safe disposal of sewage and more particularly to the conversion of aqueous sewage into potable water.

There have been many proposals and processes devised for decontaminating aqueous sewage and/or converting it into potable water. Generally, such processes are very expensive and impracticable from an economic standpoint. Further, such prior processes required the expenditure of a considerable amount of energy and large quantities of polluting chemicals. It is, therefore, an important object of the present invention to provide a method of decontaminating aqueous sewage in a novel and inexpensive manner utilizing relatively inexpensive and readily available materials, such as coal having a relatively high sulphur and a relatively low energy content. 2. Description of the Prior Art Applicant is aware of the following prior U.S. patents which may be deemed relevant to the present invention:

U.S. Pat. No. 2,125,846 — Aug. 2, 1938 — Laughlin
U.S. Pat. No. 3,063,939 — Nov. 13, 1962 — Katz
U.S. Pat. No. 3,272,740 — Sept. 13, 1966 — Gitchel et al.
U.S. Pat. No. 3,962,076 — June 8, 1976 — Hess et al.
U.S. Pat. No. 4,008,146 — Feb. 15, 1977 — Bain et al.

It is believed that the invention as claimed patentably avoids the foregoing prior art by achieving the aforementioned objective in a novel manner.

SUMMARY OF THE INVENTION

In accordance with the present invention, a high sulphur content coal is ground into particles and undergoes a coking operation in the presence of steam to form a particulate coke product and a gaseous product including sulphur dioxide and steam. The particulate coke is charged into two settling tanks to form filter beds therein. The aqueous sewage to be treated is introduced into one of the settling tanks for passage through the filter bed within which it reacts with the particulate coke both physically and chemically. A liquid effluent is withdrawn from the bottom of the settling tank while a settled solid product is periodically removed to deplete the filter bed requiring periodic recharging of the settling tank. The liquid effluent is conducted into the second settling tank for passage through the filter bed therein. The gaseous product from the coking operation is passed through a condenser and the condensate conducted to the second settling tank. An electric field is established in the second settling tank in order to electrically charge the particulate coke bed. As a result of the foregoing conditions within the second filter tank, the filter bed is operative to remove from the liquid effluent nitrates, phosphates and other such pollutants as well as bacterial contaminants. A liquid product in the form of potable water is accordingly extracted from the bottom of the second settling tank, suitable for irrigation purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF PREFERRED EMBODIMENT

Figure 1:
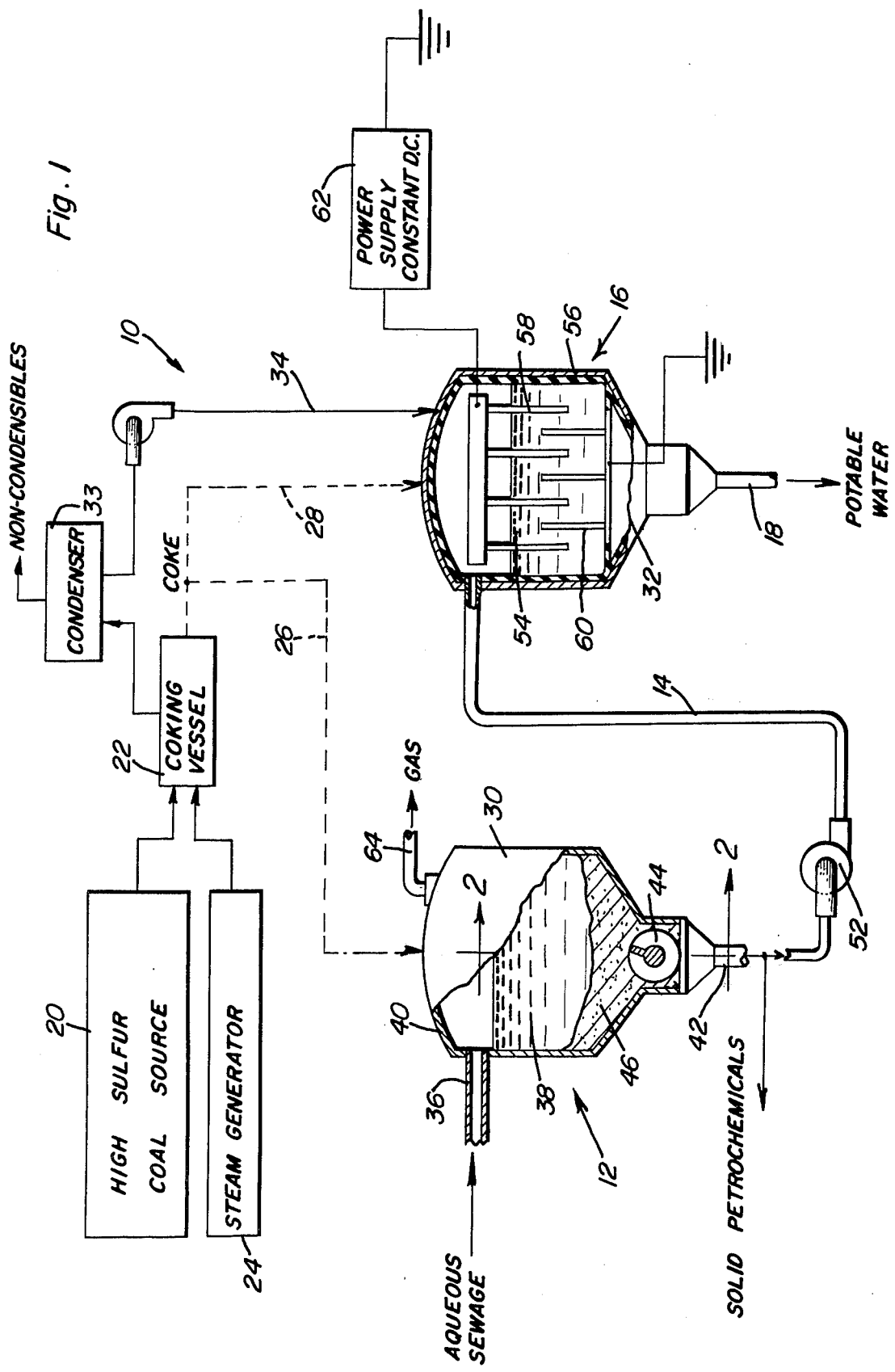
FIG. 1 is a simplified schematic illustration of the apparatus utilized in the process of the present invention with parts broken away and shown in section with respect to some of the apparatus components.

Referring now to the drawings in detail, FIG. 1 illustrates the sewage treating system of the present invention generally referred to by reference numeral 10. The system involves the processing of aqueous sewage such as raw sewage water obtained from municipal or industrial sources as the infeed to a first filter stage generally referred to by reference numeral 12. A liquid effluent obtained from the first stage 12 is conducted through conduit 14 to a second filter stage generally referred to by reference numeral 16 from which a potable water product is obtained in outlet 18.

With continued reference to FIG. 1, the process of the present invention utilizes a high sulphur content coal obtained from a presently available source 20. Coal of this type is available in large quantities but has not been mined to any great extent because of its high sulphur and low energy content. The coal is ground up into particulate form and fed to a coking vessel 22 into which steam is charged from a steam generator 24. The coking vessel forms part of any well known coking operation from which a solid particulate product in the form of coke is obtained as well as a gaseous product including a mixture of sulphur dioxide and steam. As shown by dotted lines 26 and 28 in FIG. 1, the particulate coke is utilized to charge the settling tanks 30 and 32 associated with the two filter stages 12 and 16. The gaseous product of the coking operation, on the other hand, is passed through a condenser 33 and the condensate is conducted by conduit 34 to the settling tank 32 of the second filter stage 16 in the form of a mixture of hot water and sulphates.

Figure 2:
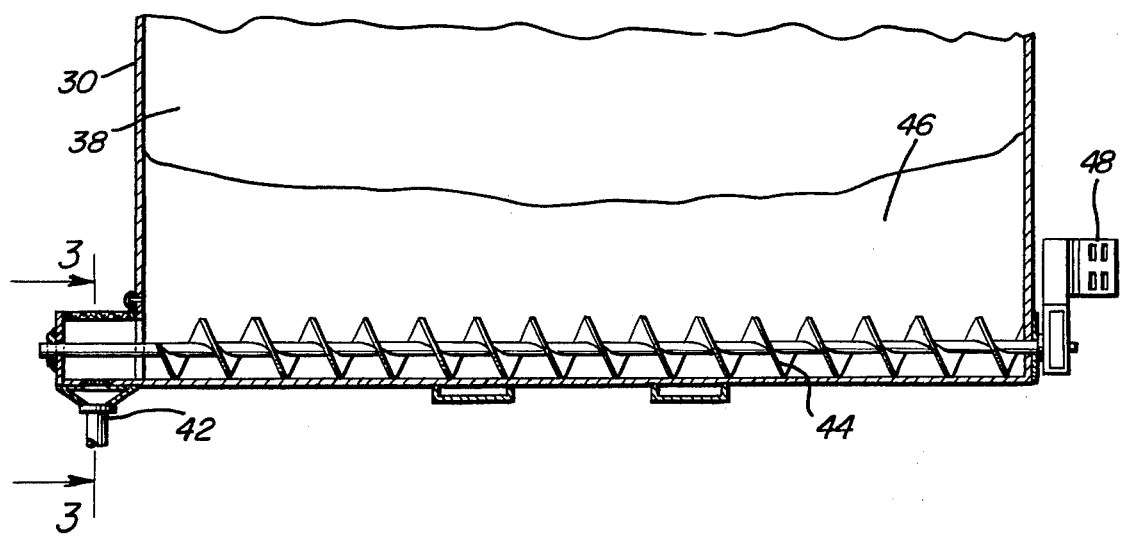
FIG. 2 is an enlarged partial sectional view taken substantially through a plane indicated by section line 2—2 of FIG. 1.
Figure 3:
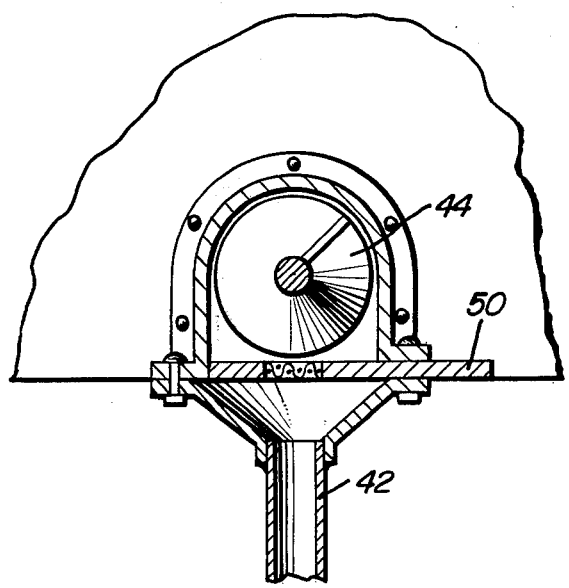
FIG. 3 is an enlarged partial sectional view taken through a plane indicated by section line 3—3 of FIG. 2.

With reference to FIGS. 1, 2 and 3, the settling tank 30 of the first filter stage is connected to an inlet conduit 36 adjacent its upper end through which the infeed of aqueous sewage is conducted. A filter bed 38 is formed within the settling tank by the particulate coke with which the settling tank is charged through an opening in its top 40. The downflow filtration or passage of aqueous sewage through the cold bed 38 in the settling tank 30 results in the extraction of a filtrate liquid from an outlet 42 located at the bottom of the settling tank adjacent one axial end of a bottom auger 44. The auger 44 is inoperative during the filtering operation. The liquid extracted through outlet 42 results not only from the physical separations from the aqueous sewage but also from chemical reactions that may occur between the sewage and the particulate coke forming the filter bed 38. As a result of such physical and chemical actions, a settled solid product, as shown by reference numeral 46, is formed at the bottom of the filter bed. Thus, the filtration operation must be periodically interrupted and the settled solid product 46 removed from the bottom of the settling tank 30. This solid product 46 may be used as the feedstock supplied to mixing units as disclosed in my prior copending application Ser. No. 835,022, filed Sept. 9, 1977. The auger 44 is set into operation by energization of its drive motor 48 and a screen element 50 slidably removed from its location above the outlet 42 in order to effect discharge of the solid product into the outlet 42 from the bottom of the settling tank. The filter element 50 when in place, will block any outflow of solid particles into the outlet 42 with the liquid during the filtration operation.

During the filtration operation aforementioned, the liquid extracted from the first filter stage 12 through outlet 42 may be displaced by a pump 52 through conduit 14 and fed into the settling tank 32 of the second filter stage 16. The settling tank 32 may be similar in construction and arrangement to the settling tank 30 and also encloses a filter zone having a static bed 54 through which the liquid from filter stage 12 passes in a downflow direction as shown. However, the space above the filter bed 54 encloses the mixture of water and sulphates conducted thereto by conduit 34 from the coking operation as aforementioned. The tank 32 is internally lined with an insulating material 56 so as to enable the establishment of an electric field within the filter bed 54. A plurality of copper plate electrodes 58 are positioned within the filter bed 54 in spaced relationship to a plurality of stainless steel plate electrodes 60 which may be grounded as shown in FIG. 1. The electrodes 58 are connected to a constant d.c. power supply 62 in order to establish the electrical field. Thus, the particulate coke which forms the filter bed 54 will have its adsorption properties enhanced in order to remove nitrates and phosphates and other such pollutants. Further, the electric field established will be operative to kill bacteria in the liquid portion of the filtrate resulting in a liquid product in outlet 18 that is free of pollutants and contaminants.

EXAMPLE

In one particular example for practicing the process of the present invention, the settling tanks are charged with the filter medium up to ⅔ of the tank volume. The filter medium in tank 30 is periodically reactivated by circulation of hydrochloric acid and water therethrough. As a result of such reactivation, carbon dioxide gas is evolved and recovered through the gas outlet 64 as shown in FIG. 1. A pH indicator is utilized to control the circulation of the hydrochloric acid solution through the filter bed during the reactivation operation. It will, of course, be appreciated that in addition to periodic reactivation of the filter bed 38, recharging thereof will be necessary because of its depletion as a result of the aforementioned periodic removal of the settled solid product 46 by use of the auger 44.

The filter bed 54 associated with the second filter stage 16 utilizes the same filter medium as that in filter bed 38. However, the filter bed 54 is not depleted as in the case of filter bed 38 and need only be periodically cleaned.

It will also be apparent that in addition to the potable water product obtained in outlet 18 from the second filter stage 16, the solid product periodically removed from the first filter stage 12 will include many different petrochemicals, dependent upon the specific contents of the aqueous sewage infeed and the coal from source 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A process for decontaminating sewage by use of coal having a high sulfur content, including the steps of: coking the coal to form a particulate product and a gaseous product; charging first and second filter zones with said particulate product to form filter beds therein; passing the sewage through the first of the filter zones to extract a liquid effluent and form a settled solid product; electrically charging the filter bed in the second of the settling zones; condensing the gaseous product to form a condensate; and conducting said condensate and the liquid effluent to said second of the settling zones for passage through the electrically charged filter bed to extract a decontaminated liquid product therefrom.

2. The process of claim 1 including the steps of: periodically removing the settled solid product from the filter bed in said first of the filter zones; and recharging said first of the filter zones following depletion of the filter bed therein by removal of the settled product.

3. A process for removing contaminants from waste water which comprises the steps of: introducing solid particulate coke into two vessels to form filter beds therein; introducing the waste water into a first of the vessels for passage therethrough; recovering a liquid filtrate from said first of the vessels; transferring said liquid filtrate to a second of the vessels for passage through the filter bed maintained therein; electrically charging the filter bed within said second of the vessels during said passage of the liquid filtrate therethrough; recovering contaminant depleted waste water from said second vessel; and periodically interrupting the foregoing operating steps to withdraw a settled solid product from the filter bed of the first vessel, said step of electrically charging the filter bed including: introducing a mixture of water and sulphates into the second vessel, said mixture being derived from condensation of a gaseous product evolved from a coking operation in which a high sulfur containing containing coal is converted into the coke introduced into the vessels to form the filter beds therein; and applying an electric field to the filter bed within the second vessel.

* * * * *